US 9,946,091 B2

(12) United States Patent
Kawamoto

(10) Patent No.: US 9,946,091 B2
(45) Date of Patent: Apr. 17, 2018

(54) EYEGLASSES FRAME

(71) Applicant: Kawamoto Optical Industrial Co., Ltd., Osaka (JP)

(72) Inventor: Shuichi Kawamoto, Osaka (JP)

(73) Assignee: KAWAMOTO OPTICAL INDUSTRIAL CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/441,279

(22) Filed: Feb. 24, 2017

(65) Prior Publication Data

US 2018/0039095 A1    Feb. 8, 2018

(30) Foreign Application Priority Data

Aug. 2, 2016   (JP) ................................ 2016-151929

(51) Int. Cl.
  *G02C 5/22* (2006.01)
  *G02C 5/14* (2006.01)

(52) U.S. Cl.
  CPC .......... *G02C 5/2281* (2013.01); *G02C 5/146* (2013.01)

(58) Field of Classification Search
  CPC ...... G02C 5/2218; G02C 5/22; G02C 5/2281; G02C 9/02
  USPC ..................... 351/153, 140; 16/228
  See application file for complete search history.

(56) References Cited

U.S. PATENT DOCUMENTS

| | | | |
|---|---|---|---|
| 4,605,293 A | | 8/1986 | Blumenthal |
| 4,832,479 A | * | 5/1989 | Beyer ....................... G02C 5/10 16/228 |
| 6,336,250 B1 | * | 1/2002 | Takeda ..................... G02C 5/10 16/228 |

FOREIGN PATENT DOCUMENTS

JP         59-188619 A    10/1984

* cited by examiner

*Primary Examiner* — Hung Dang
(74) *Attorney, Agent, or Firm* — Bacon & Thomas, PLLC

(57) ABSTRACT

The eyeglasses frame includes a first hinge barrel provided on a lens holding portion, a second hinge barrel provided on a temple, a first screw that pivotably couples the first hinge barrel and the second hinge barrel, and a second screw provided in the second hinge barrel and contactable with the first hinge barrel. A tip portion of the first hinge barrel is a cam that includes a first depression where the second screw comes to rest when the eyeglasses frame is completely open, a second depression where the second screw comes to rest when the eyeglasses frame is completely closed, substantially straight portions that join the first and second depressions, and a corner portion where the substantially straight portions change direction at a point therebetween.

3 Claims, 4 Drawing Sheets

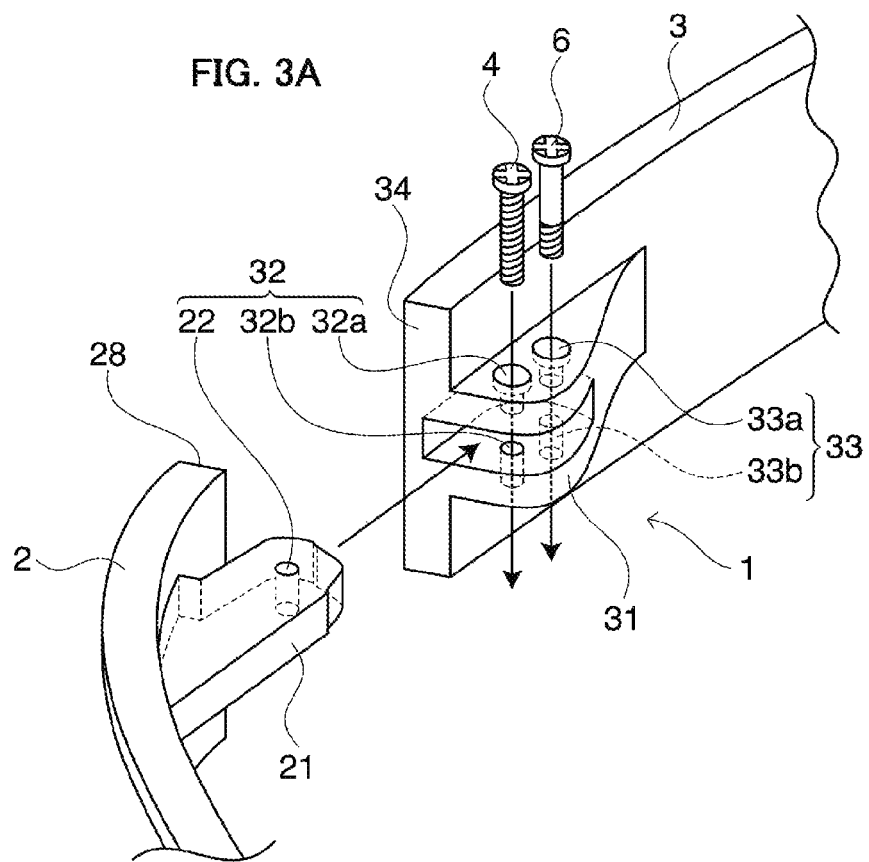
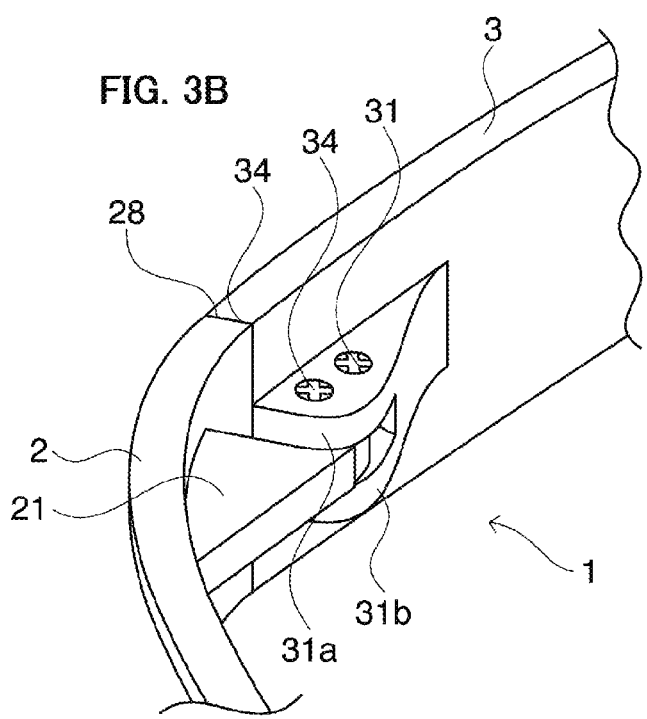

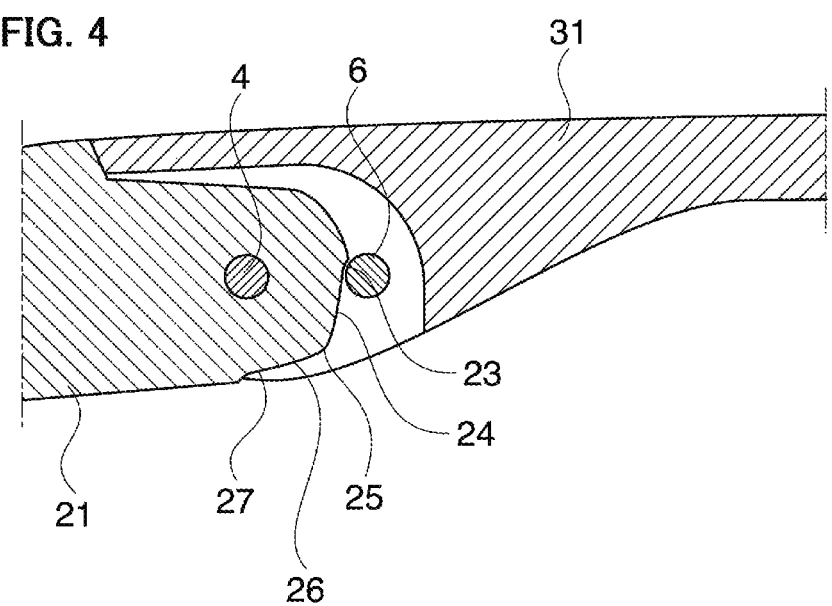

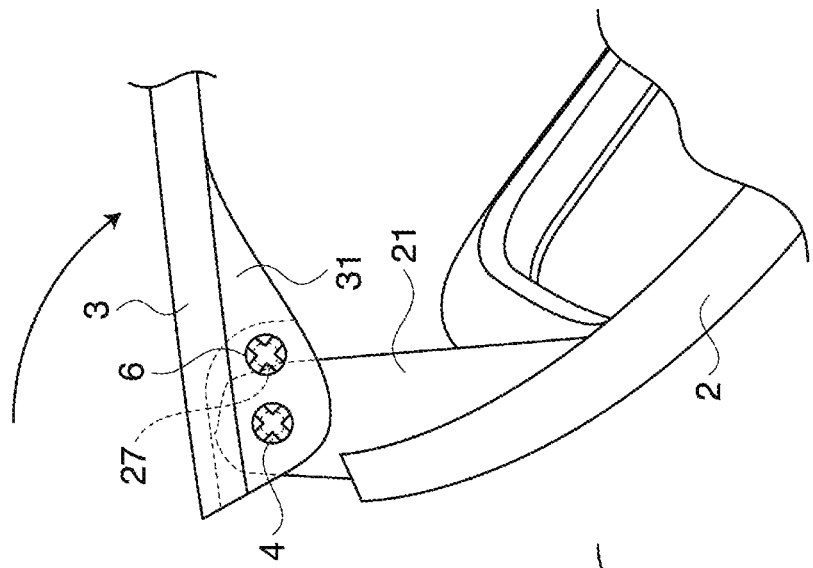
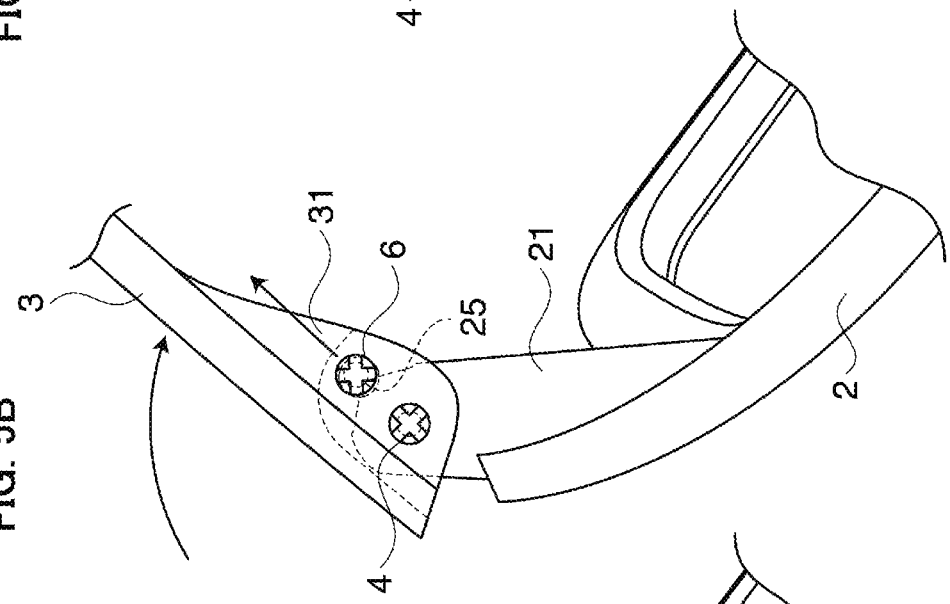
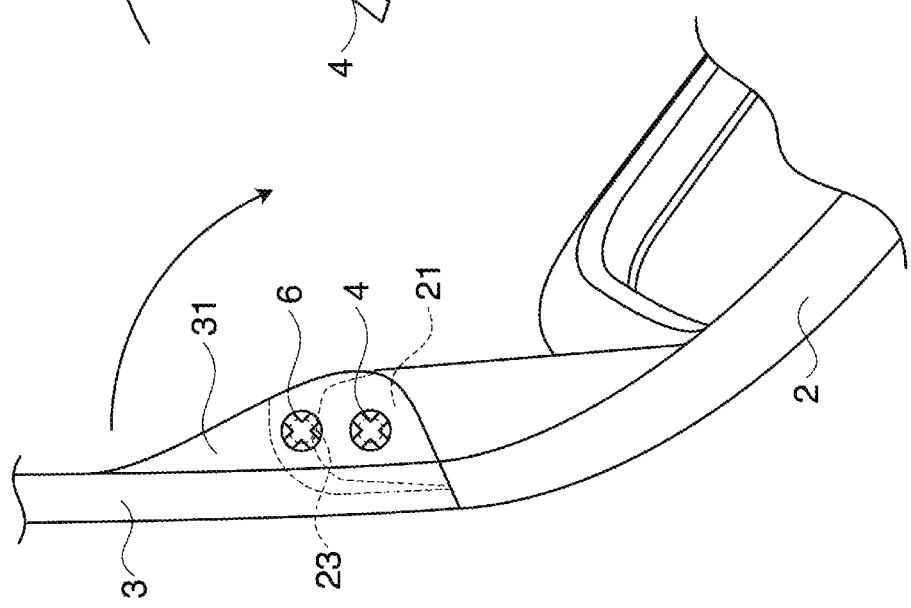

EYEGLASSES FRAME

BACKGROUND OF THE INVENTION

1. Field of the Invention

The present invention relates to an eyeglasses frame, and particularly to an eyeglasses frame that is provided with a hinge with which a stable open/close operation can be performed and a reduction in size and a reduction in weight can be achieved.

2. Description of Related Art

The hinge of an eyeglasses frame allows opening and closing of the temple by a screw, which acts as a pivot axis, coupling hinge barrels respectively provided on a lens holding portion and the temple. In the hinge, the pivot operation of the temple can be adjusted through the tightness of the screw, and when the screw is tightened firmly, friction between the hinge barrels increases and pivoting of the temple becomes stiff, and when the screw is loosened, the temple pivots more freely.

However, the hinge barrels move in a state of being in press-contact with each other when the temple is opened and closed, and therefore, if the temple pivots stiffly, it is difficult to realize a smooth open/close operation, and conversely, if the temple pivots freely, the temple is likely to move in an undesired manner. As a result, it is difficult to set the temple in a stable state at times such as when the glasses are worn with the temple open, and when the glasses are stored with the temple closed. Also, when the open/close operation that causes the temple to pivot is repeated, the frictional resistance against the pivoting of the temple will gradually decrease, and the tightness of the screw will need to be readjusted.

In light of the issues involved with such a hinge, for example, an eyeglasses frame is disclosed in JPA-S59-188619 in which an elastic biasing means (spring) is provided on one of two frame portions and a cam member is provided on the other frame portion, and a rotation member is set so as to be pressed against the cam member by the elastic biasing means to stably set the one frame portion to a predetermined open/close position when an open/close operation is performed.

SUMMARY OF THE INVENTION

In the foregoing JPA-S59-188619, an elastic biasing means (spring) is incorporated in the hinge, and therefore the size of the hinge increases, and it is difficult to realize a reduction in weight and a reduction in size of the eyeglasses frame. In examining the design of the eyeglasses frame, the size of the hinge needs to be taken into consideration, therefore limiting freedom of design.

Thus, it is an object of the present invention to provide an eyeglasses frame that has a hinge with which a stable open/close operation can be performed and a reduction in size and a reduction in weight can be achieved.

An eyeglasses frame according to the present invention that achieves the foregoing object includes: a lens holding portion; a first hinge barrel provided on the lens holding portion; a temple; a second hinge barrel provided on the temple; a first screw that pivotably couples the first hinge barrel and the second hinge barrel; a second screw provided in the second hinge barrel and contactable with the first hinge barrel; and a cam that is a cam of a tip portion of the first hinge barrel and includes a first depression where the second screw comes to rest when the eyeglasses frame is completely open, a second depression where the second screw comes to rest when the eyeglasses frame is completely closed, a contour portion that joins the first and second depressions, and a corner portion, where the contour portion changes direction at an intermediate point.

It is preferable that the second screw is only tapped on a tip thereof, and a portion that comes into contact with the first hinge barrel is a pin that is not tapped.

It is preferable that the contour portion that joins the first and second depressions consists of two substantially straight portions that change direction at the corner portion.

With the present invention, the temple is stabilized at the first depression of the first hinge barrel, and moves rapidly in a closing direction upon passing over a corner portion and is stabilized again at a second depression. In this way, this eyeglasses frame can stabilize the open/close operation. Furthermore, because a spring is not built into the hinge barrel for stabilization, the size of the hinge can be reduced, which leads to a reduction in the weight and a reduction in the size of the eyeglasses frame.

An embodiment of the present invention will be described below with reference to the attached drawings.

BRIEF DESCRIPTION OF THE DRAWINGS

FIG. 3A is an exploded perspective view of a hinge portion, and FIG. 3B is a perspective view of the hinge portion in an assembled state.

FIG. 4 is horizontal cross-sectional view of the eyeglasses frame.

FIGS. 5A to 5C are plan views of the eyeglasses frame showing states of stages of opening and closing.

DETAILED DESCRIPTION OF THE INVENTION

Figure 1:
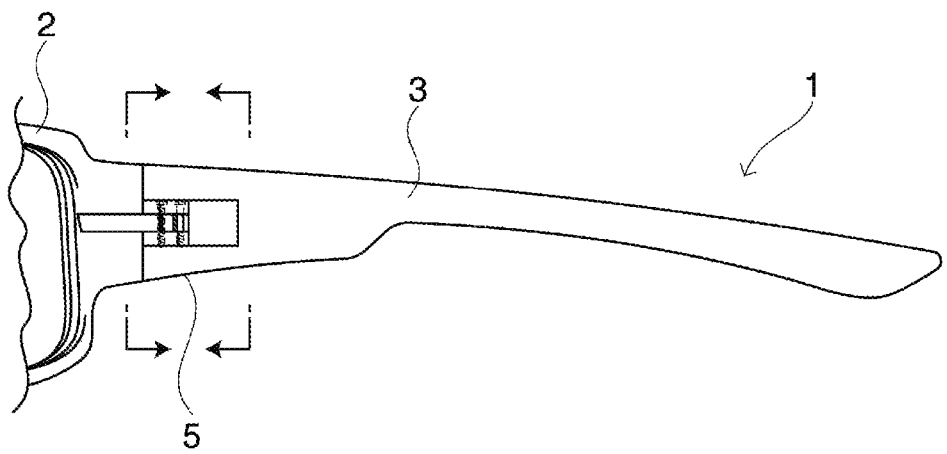
FIG. 1 is a partial side view of an eyeglasses frame according to an embodiment of the present invention.

As shown in FIGS. 1 to 5, an eyeglasses frame 1 according to an embodiment of the present invention has a hinge 5. The hinge 5 enables pivoting of a temple 3 by a first screw 4, which acts as a pivot axis, coupling hinge barrels 21 and 31 respectively provided on a lens holding portion 2 and the temple 3.

A through-hole 22 is provided in a tip of the hinge barrel on the lens holding portion side (hereinafter "first hinge barrel" 21). Through holes 32a and 32b are provided respectively in the upper and lower hinge barrel portions on the temple side (including an upper hinge barrel portion 31a and a lower hinge barrel portion 31b, collectively referred to as "second hinge barrel" 31), so as to sandwich the first hinge barrel 21. The first screw 4, which acts as the pivot axis, is inserted through these three through-holes 22, 32a, and 32b (collectively referred to as "first through hole" 32). As shown in FIG. 3A, the first screw 4 is tapped along the entire length thereof.

Figure 2:
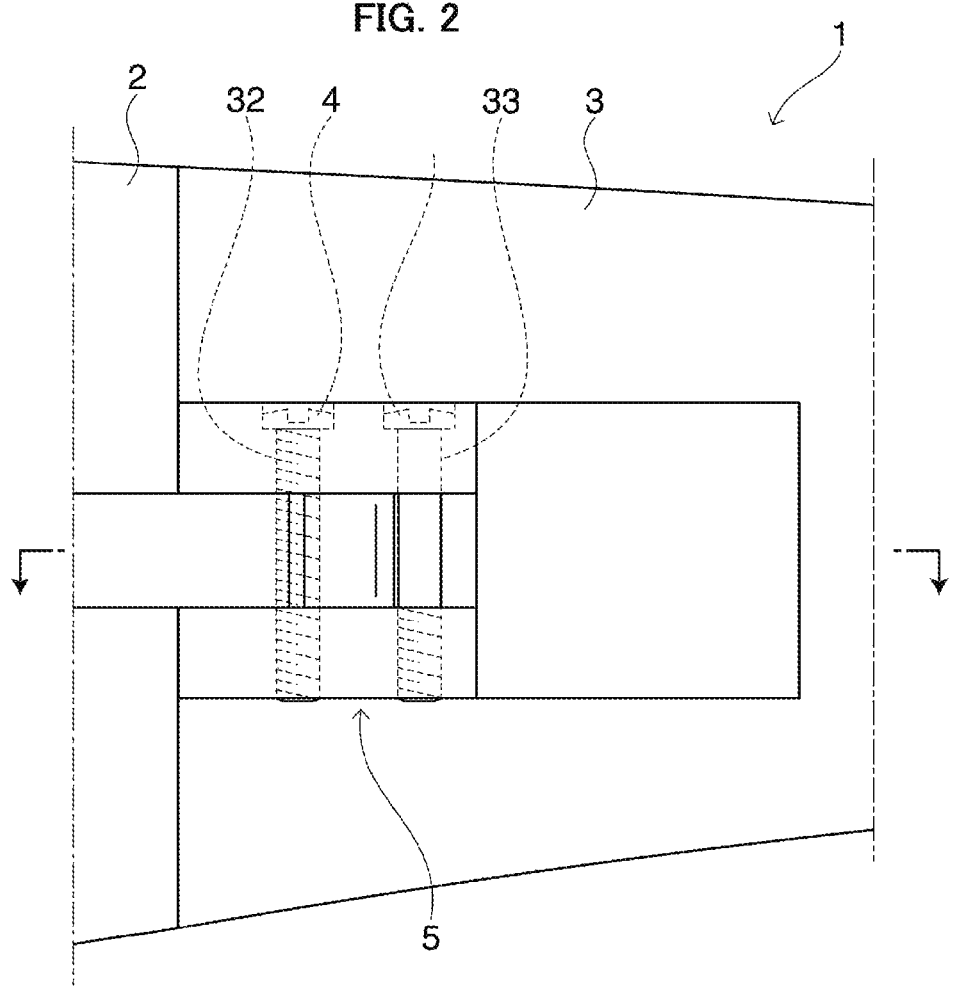
FIG. 2 is an enlarged view of the portion demarcated by arrows in FIG. 1.

A characteristic of the eyeglasses frame of the present embodiment is that a separate second through-hole 33 (33a and 33b) is provided adjacent to the first through hole 32. This second through-hole 33 passes through the upper and lower hinge barrels 31a and 31b of the second hinge barrel 31, but the second through-hole 33 is shifted from the position of the first hinge barrel 21 as shown in FIG. 4 and FIGS. 5A to 5C, and therefore does not pass through the first hinge barrel 21. A second screw 6 is inserted into the second through-hole 33. As shown in FIGS. 2 and 3A, the second screw 6 is an unrotatable fixed screw, of which the tip portion is tapped, and is mostly an untapped pin (including the portion that comes into contact with the first hinge barrel 21 that is described later).

As shown in FIG. 4, the tip of the first hinge barrel 21 is a cam member that does not simply have an elliptical shape but is shaped with a unique contour. The middle portion of the tip of the first hinge barrel 21 has a first depression 23, and the tip of the first hinge barrel 21 has a substantially inclined portion 24 from there in a closing direction of the temple. Then, the direction changes at a corner portion 25, and a substantially straight steeply inclined portion 26 is formed. A separate second depression 27 is formed immediately before the end point, and movement beyond this point is not possible.

As shown in FIGS. 5A to 5C, the tip of the first hinge barrel 21 and the second screw 6 are constantly in contact with each other, and the position where both portions come into contact changes in accordance with opening and closing of the temple 3.

FIG. 5A shows the temple 3 when it is completely open. At this time, the second screw 6 is at the first depression 23, which is the starting point of the first hinge barrel 21. Because an end portion 28 of the lens holding portion 2 and an end portion 34 of the temple 3 are in contact with each other (FIG. 3B), and the second screw 6 is at the first depression 23, the temple 3 will not move excessively toward the open side.

Next, when the temple 3 pivots and reaches the position shown in FIG. 5B, the first hinge barrel 21 reaches the corner portion 25, which is the point where the first hinge barrel 21 changes direction, and is met with resistance. Upon passing over the corner portion 25, the second screw 6 rapidly runs down the steeply inclined portion 26.

Upon reaching the state shown in FIG. 5C, the second screw 6 reaches the second depression 27 of the first hinge barrel 21, and the temple 3 is completely folded.

That is to say, the temple 3 of this embodiment is stabilized at the first depression 23 of the first hinge barrel 21, and moves rapidly in the closing direction upon passing over the corner portion 25 and is stabilized again at the second depression 27. In this way, the eyeglasses frame can stabilize the open/close operation. Furthermore, because a spring is not built into the hinge barrel for stabilization, the size of the hinge can be reduced, which leads to a reduction in weight and a reduction in size of the eyeglasses frame.

What is claimed is:

1. An eyeglasses frame comprising:
    a lens holding portion;
    a first hinge barrel provided on the lens holding portion;
    a temple;
    a second hinge barrel provided on the temple;
    a first screw that pivotably couples the first hinge barrel and the second hinge barrel;
    a second screw provided in the second hinge barrel and contactable with the first hinge barrel; and
    a cam that is a cam of a tip portion of the first hinge barrel and includes a first depression where the second screw comes to rest when the eyeglasses frame is completely open, a second depression where the second screw comes to rest when the eyeglasses frame is completely closed, a contour portion that joins the first and second depressions, and a corner portion, where the contour portion changes direction at an intermediate point.

2. The eyeglasses frame according to claim 1, wherein the second screw is only tapped on a tip thereof and a portion that comes into contact with the first hinge barrel is a pin that is not tapped.

3. The eyeglasses frame according to claim 1, wherein the contour portion that joins the first and second depressions consists of two substantially straight portions that change direction at the corner portion.

* * * * *